United States Patent [19]
Kudou

[11] Patent Number: 5,363,494
[45] Date of Patent: Nov. 8, 1994

[54] BUS INTERFACE CIRCUIT FOR CONNECTING BUS LINES HAVING DIFFERENT BIT RANGES

[75] Inventor: Tsuneaki Kudou, Yokohama, Japan

[73] Assignee: Kabushika Kaisha Toshiba, Kawasaki, Japan

[21] Appl. No.: 964,886

[22] Filed: Oct. 22, 1992

[30] Foreign Application Priority Data

Oct. 24, 1991 [JP] Japan ................ 3-277509

[51] Int. Cl.⁵ .................. G06F 13/40; G06F 13/00
[52] U.S. Cl. ............................ 395/325; 395/250; 364/240.2; 364/240.3; 364/232.8; 364/239; 364/DIG. 1
[58] Field of Search ............... 395/325, 250, 275, 425, 395/800; 365/230.01

[56] References Cited

U.S. PATENT DOCUMENTS

| | | | |
|---|---|---|---|
| 4,683,534 | 7/1987 | Tietjen et al. | 364/200 |
| 5,113,369 | 5/1992 | Kijnoshita | 395/325 |
| 5,131,083 | 7/1992 | Crawford et al. | 395/275 |
| 5,148,539 | 9/1992 | Enomoto et al. | 395/425 |
| 5,191,653 | 3/1993 | Banks et al. | 395/275 |
| 5,255,374 | 10/1993 | Aldereguia et al. | 395/325 |
| 5,274,763 | 12/1993 | Banks | 395/250 |
| 5,274,795 | 12/1993 | Vachon | 395/500 |

*Primary Examiner*—Gopal C. Ray
*Attorney, Agent, or Firm*—Oblon, Spivak, McClelland, Maier & Neustadt

[57] ABSTRACT

A first bus wiring line to which a plurality of first circuits each having the same bit range are connected, a second bus wiring line to which a plurality of second circuits each having a bit range smaller than that of each of the first circuits are connected, and a bus interface circuit having a buffer circuit connected between a portion of the first bus wiring line and the second bus wiring line and a dummy buffer circuit connected to the remaining portion of the first bus wiring line are arranged in an integrated circuit. Fox this reason, when a plurality of circuits having different bit ranges are connected to the bus wiring lines, the loads of the bus wiring lines can be made uniform, and a data transfer operation through the bus lines can be performed at a high speed. The operating frequency of a clock can be increased, and the performance of the system can be improved.

12 Claims, 7 Drawing Sheets

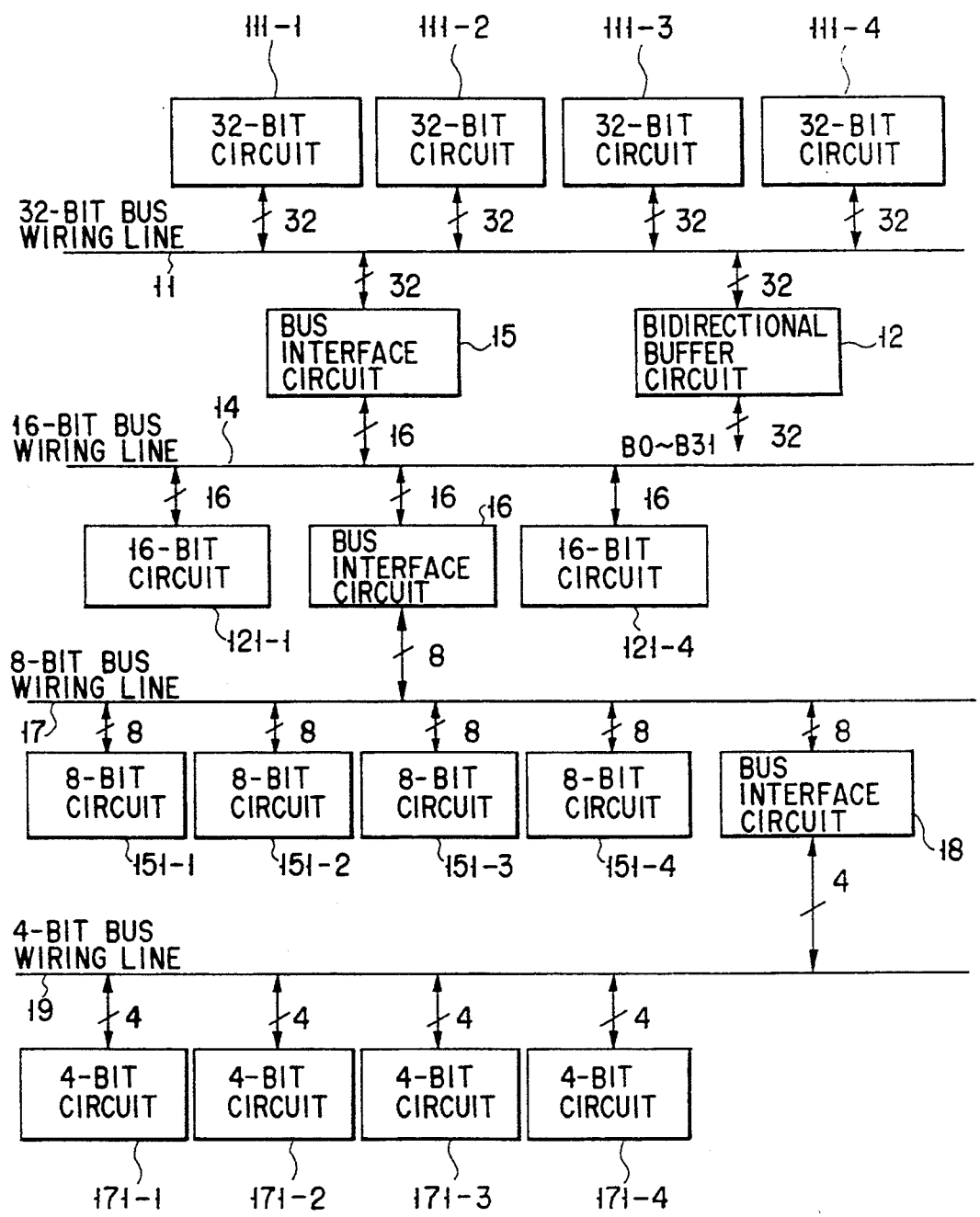
F I G. 3

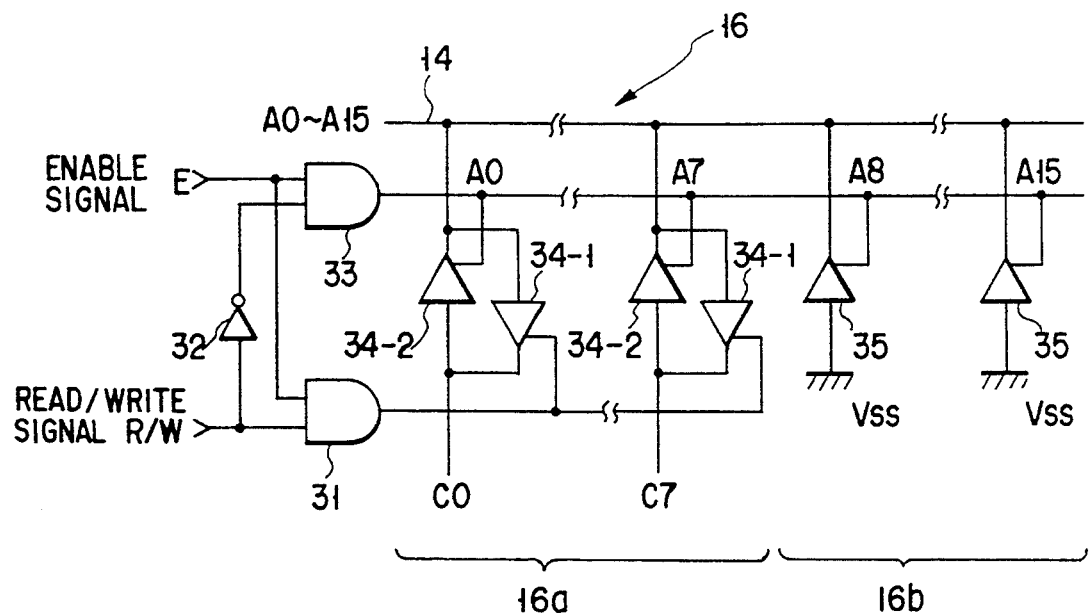
F I G. 5
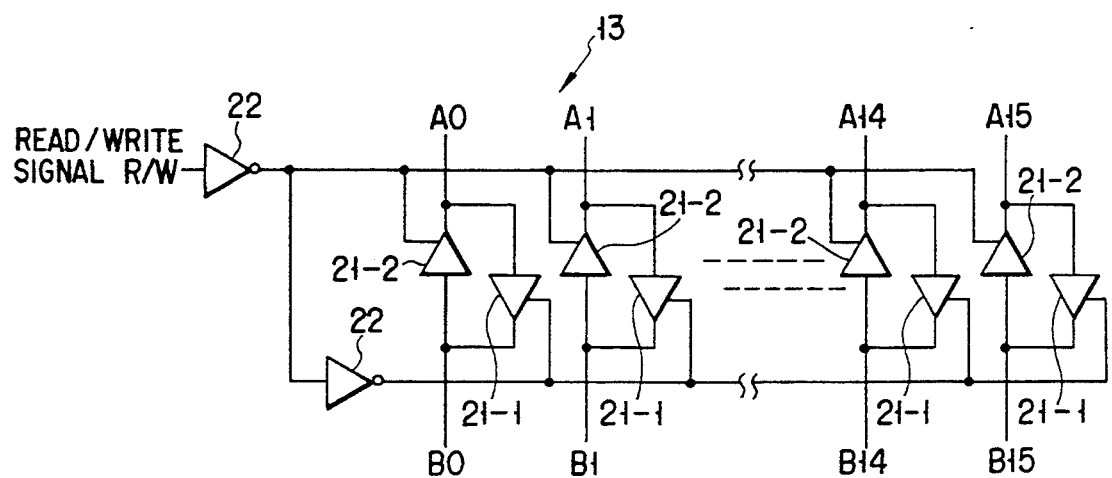
F I G. 6

| ADDRESS | | | DESIGNATED REGISTER |
|---|---|---|---|
| AD2 | AD1 | AD0 | |
| 0 | 0 | 0 | 121-1 |
| 0 | 0 | 1 | 121-2 |
| 0 | 1 | 0 | 121-3 |
| 0 | 1 | 1 | 121-4 |
| 1 | 0 | 0 | 151-1 |
| 1 | 0 | 1 | 151-2 |
| 1 | 1 | 0 | 151-3 |
| 1 | 1 | 1 | 151-4 |

BUS INTERFACE CIRCUIT FOR CONNECTING BUS LINES HAVING DIFFERENT BIT RANGES

BACKGROUND OF THE INVENTION

1. Field of the Invention

The present invention relates to a bus system of a semiconductor device arranged in an LSI (Large-Scale Integrated Circuit) and, more particularly, to a bus system of a semiconductor device to which a plurality of circuits having different bit ranges are connected.

2. Description of the Related Art

FIG. 1 is a block diagram showing a bus system arranged in a conventional semiconductor device. A bus wiring line 71 has a 16-bit range. 16-bit registers 721-1 to 721-4 each having the same bit range as that of the bus wiring line 71 are connected to the bus wiring line 71. An external input/output bidirectional buffer circuit 73 having a 16-bit range which is the same as that of the bus wiring line 71 is connected to the bus wiring line 71. 8-bit registers 741-1 to 741-4 each having a bit range which is half the bit range of the bus wiring line 71 is connected to the lower 8 bits (A0 to A7). With the above arrangement, the fan-in counts and fan-out counts of the circuits connected to the bus wiring line 71 are compared with each other. That is, the four registers 721-1 to 721-4 and the buffer circuit 73 (total five circuits) are connected to the upper 8 bits (A8 to A15) of the bus wiring line 71. In addition to the above five circuits, the four registers 741-1 to 741-4, i.e., total 9 circuits, are connected to the lower 8 bits (A0 to A7) of the bus wiring line 71. Therefore, the upper 8 bits and lower 8 bits of the bus wiring line 71 are different from each other in load, i.e., the wiring capacity of the bus wiring line 71 is different from the gate capacity of the MOS transistors of the circuits. In this manner, the bus wiring line 71 has variations in load in units of bits. When the registers connected to the bus wiring line 71 have he same structure and data transfer operations between the registers, for example, is performed, times required for the data transfer operations are different from each other due to the variations in load of the bus wiring line.

FIGS. 2(a) to 2(c) are timing charts showing the operations of the circuits connected to the bus wiring line when data is transferred from, e.g., the 16-bit register 721-1 to the 16-bit register 721-4. 16-bit data D1 stored in the 16-bit register 721-1 is output to the bus wiring line 71 in synchronization with rise time t1 of a clock signal CLK. In this case, since the load of the lower 8 bits (A0 to A7) of the bus wiring line 71 is larger than that of the upper 8 bits (A8 to A15), the 16-bit data D1 is transferred up to the input of the 16-bit register 721-4. The speed of data D1a of the lower bits is lower than that of data D1b of the upper bits, and the transfer times of the data D1a and D1b have a difference Δt. As a result, the data transfer speed of the bus wiring line 71 depends on the lower 8 bits having the lower speed. The data D1 is stored in the 16-bit register 721-4 in synchronization with rise time t2 of the clock signal CLK. If the lower 8 bits (A0 to A7) have the same speed as that of the upper 8 bits (A8 to A15), the duty cycle of the clock signal CLK can be increased to the operating speed of the upper 8 bits. That is, since the duty cycle of the clock signal CLK is determined depending on data having a minimum transfer speed and selected from the data of the bus wiring line 71, the operating frequency of the clock signal CLK cannot be increased. As a result, the operating frequency which influences the performance of the system is limited.

SUMMARY OF THE INVENTION

The present invention has been made to solve the above problem, and has as its object to provide a bus system capable of obtaining a uniform load capacity of a bus wiring line, performing a data transfer operation through the bus wiring line at a high speed, increasing the operating frequency of a clock, and improving the performance of the system, when a plurality of circuits having different bit ranges are to be connected to the system.

According to an aspect of the present invention, there is provided a bus system of a semiconductor device, comprising: a plurality of bus wiring lines each having predetermined bit ranges, at least two of which are connected to each other; and a plurality of interface circuits each having a buffer circuit connected between the two bus wiring lines having the different predetermined bit ranges and a dummy buffer circuit connected to a remaining portion of the bus wiring line having a larger predetermined bit range.

According to another aspect of the present invention, there is provided a bus system of a semiconductor integrated circuit, comprising: a first bus wiring line to which a plurality of first circuits each having the same bit range are connected; a second bus wiring line to which a plurality of second circuits each having a bit range smaller than that of each of the first circuits are connected; and a bus interface circuit having a buffer circuit connected between a portion of the first bus wiring line and the second bus wiring line and a dummy buffer circuit connected to a remaining portion of the first bus wiring line.

A bus system is arranged such that the bus wiring lines to which a plurality of circuits having different bit ranges are connected are divided for the circuits except for a circuit having the maximum bit count. As a result, the load capacities of the bus wiring lines are made uniform, and transfer times are constant in units of bits. That is, the first bus wiring line (global bus) and the second bus wiring line (local bus) have uniform loads, and each of the loads of the bus wiring lines is decreased compared with a conventional load. For this reason, the speed of a data transfer operation through the bus wiring lines is increased. Therefore, the operating frequency of a clock can be increased when data is transferred through the bus wiring lines, and the performance of the system can be improved.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIG. 3 is a block diagram showing a bus system of a semiconductor device according to an embodiment of the present invention;

FIG. 5 is a circuit diagram showing a bus interface circuit in FIG. 4;

FIG. 6. is a circuit diagram showing a 16-bit bidirectional buffer circuit in FIG. 4;

DETAILED DESCRIPTION OF THE PREFERRED EMBODIMENTS

Figure 1:
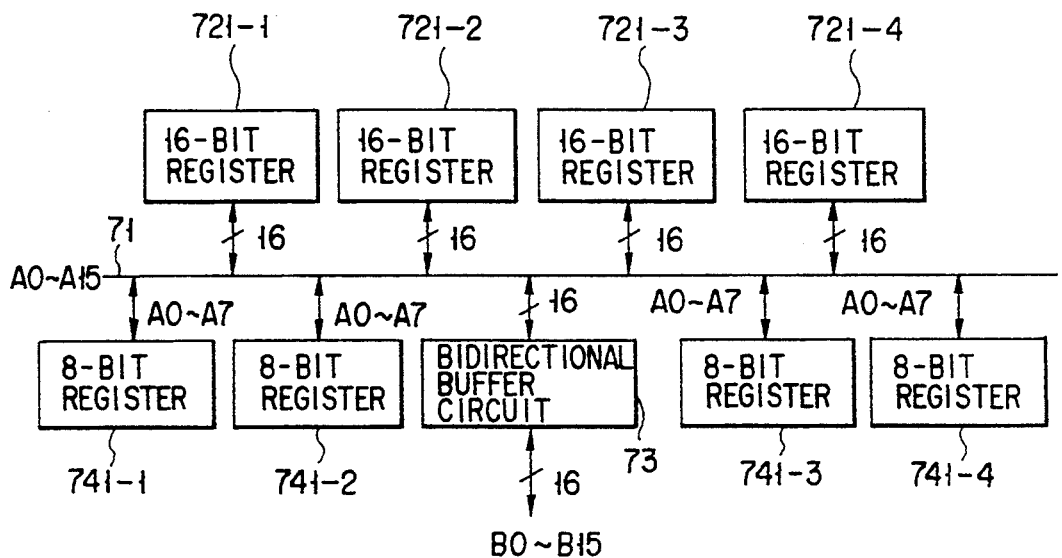
FIG. 1 is a block diagram showing a conventional bus system a semiconductor device.
Figure 2:
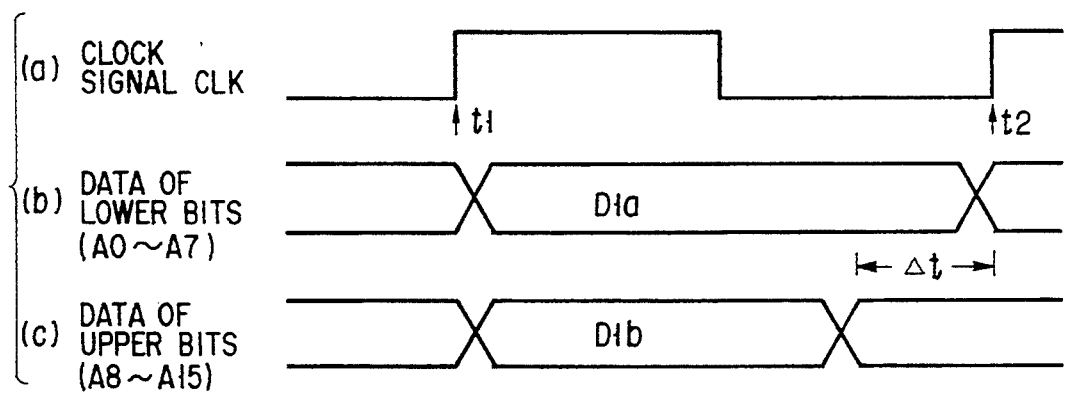
FIG. 2 shows timing charts showing waveforms explaining the operations of the circuits in FIG. 1.

A bus system of a semiconductor device according to an embodiment of the present invention will be described below with reference to the accompanying drawings.

FIG. 3 is a block diagram showing the bus system of the semiconductor device according to the embodiment of the present invention. In FIG. 3, as a plurality of bus wiring lines, a 32-bit bus wiring line 11, a 16-bit bus wiring line 14, an 8-bit bus wiring line 17, and a 4-bit bus wiring line 19 are illustrated. In the present invention, the number of the plurality of bus wiring lines and the bit ranges of the bus wiring lines are not limited to specific values and can be arbitrarily set. 32-bit circuits 111-1 to 111-4 and a 32-bit bidirectional buffer circuit 12 for performing input/output operations with other circuits (not shown) are connected to the 32-bit bus wiring line 11. A bus interface circuit 15 is connected to the 32-bit bus wiring line 11 such that the fan-in count is set equal to the fan-out count when viewed from the bus wiring line 11 when the bus wiring line 11 is connected to the 16-bit bus wiring line 14 having a bit range different from that of the bus wiring line 11. Similarly, 16-bit circuits 121-1 to 121-4 and a bidirectional buffer circuit 13 are connected to the 16-bit bus wiring line 14, and a bus interface circuit 16 is connected to the 16-bit bus wiring line 14 to be connected to the 8-bit bus wiring line 17 having a bit range different from that of the 16-bit bus wiring line 14. As will be described later, the bus interface circuits 15 and 16 and a bus interface circuit 18 which are used for connecting bus wiring lines having different bit ranges to each other have the characteristic features of the present invention.

Figure 4:
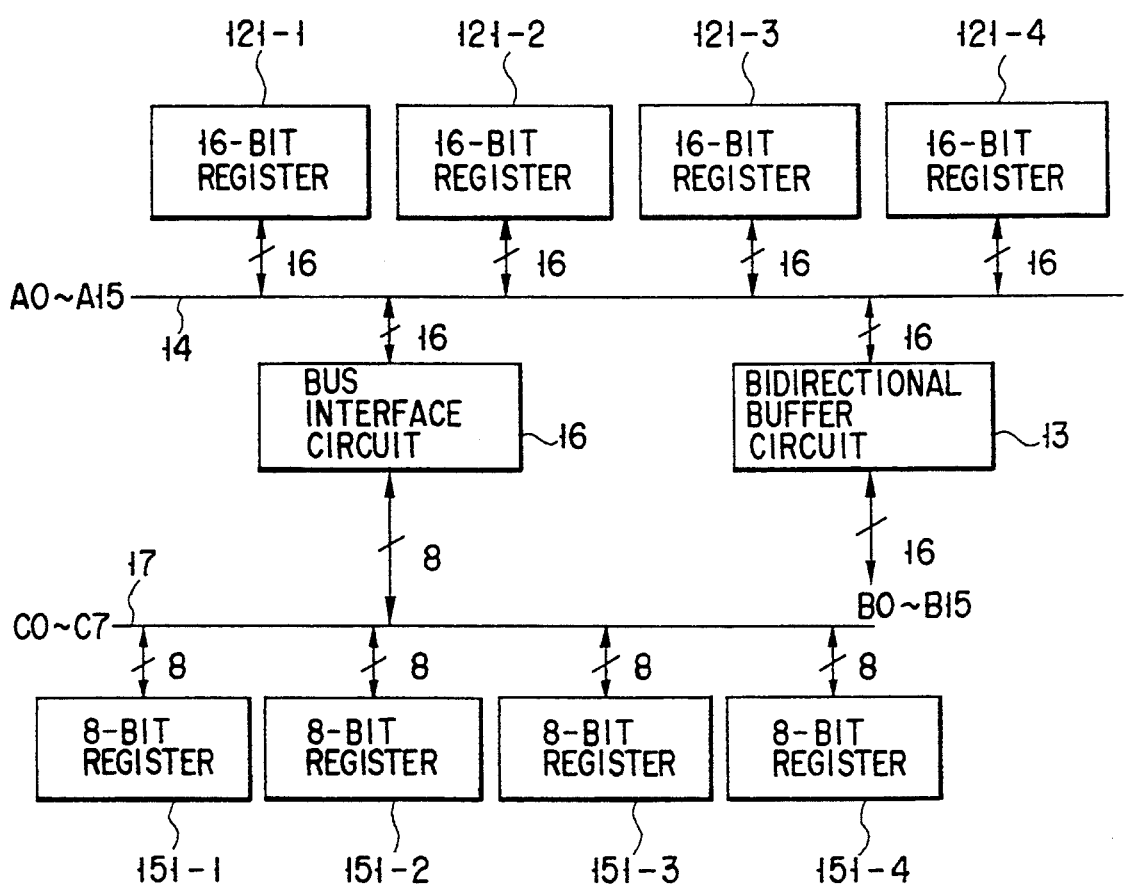
FIG. 4 is a block diagram showing a part of an arrangement in FIG. 3 in detail.

FIG. 4 shows a part of an arrangement of the embodiment of the present invention of FIG. 3 in detail. FIG. 4 is a block diagram showing, e.g., a bus system arranged in a microprocessor. In FIG. 4, the first bus wiring line (global bus) 14 has a 16-bit range, and first registers 121-1 to 121-4 each having a 16-bit range equal to that of the bus wiring line 14 are connected to the first bus wiring line 14. The external input/output bidirectional buffer circuit 13 having a 16-bit range equal to that of the bus wiring line 11 is connected to the bus wiring line 11. The second bus wiring line (local bus) 17 having an 8-bit range is arranged independently of the first bus wiring line 14. Second registers 151-1 to 151-4 each having an 8-bit range equal to that of the bus wiring line 17 are connected to the second bus wiring line 17. The bus interface circuit 16, as explained in FIG. 5, has a bidirectional buffer circuit 16a connected between the lower 8 bits (A0 to A7) of the first bus wiring line 14 and the 8 bits (C0 to C7) of the second bus wiring line 17 and a dummy buffer circuit 16b. The dummy buffer circuit 16b is connected to the upper 8 bits (AS to A15) of the first bus wiring line 14 such that a load when viewed from the bus is set equal to that of each of the 16-bit registers 121-1 to 121-4.

FIG. 5 is a block diagram showing an arrangement of the bus interface circuit 16 in FIG. 4. An AND circuit 31 receives an enable signal E and a read/write signal R/W. An inverter circuit 32 receives the signal R/W. An AND circuit 33 receives the enable signal E and the output signal from the inverter circuit 32. The 8-bit bidirectional buffer circuit 16a is constituted by a plurality of bit lines having a pair of tri-state buffer circuits 34-1 and 34-2. The buffer circuits 34-1 and 34-2 are connected between the first bus wiring line 14 (A0 to A15) and the second bus wiring line 17 (C0 to C7). Signal transmission directions are switched and controlled in response to output signals from the AND circuits 31 and 33 in the buffer circuits 34-1 and 34-2. The 8-bit dummy buffer circuit 16b is constituted by a plurality of bit lines having tri-state buffer circuits 35 each having an input node connected to a ground potential Vss ("0" level) and an output node connected to the upper 8 bits (A8 to A15) of the first bus wiring line 14. The activation/non-activation states of the tri-state buffer circuits 35 are controlled in response to the output signal from the AND circuit 33.

FIG. 6 shows an arrangement of the 16-bit bidirectional buffer circuit 13. The 16-bit buffer circuit 13, as is well-known, is constituted by a tri-state buffer circuit 21 and an inverter circuit 22. In this case, the 16-bit bus signal (B0 to B15) of the external input/output bus wiring line and the read/write signal R/W go to "1" level in a read mode and go to "0" level in a write mode.

Figure 7:
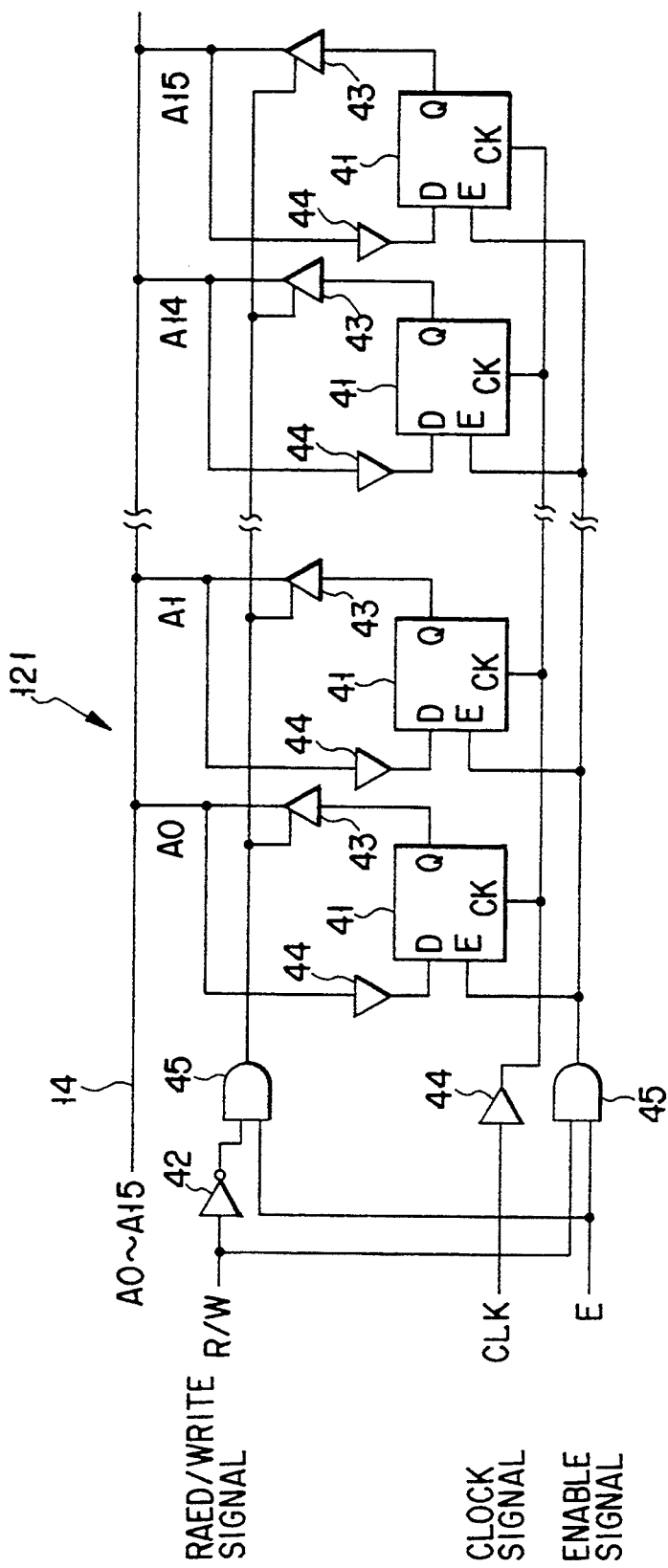
FIG. 7 is a circuit diagram showing a 16-bit register in FIG. 4.

FIG. 7 is a circuit diagram showing an arrangement of each of the 16-bit registers 121-1 to 121-4 in FIG. 4. Each of the 16-bit registers 121, as is well-known, is constituted by D flip-flops (F/F) 41 each having an enable terminal (E), an inverter circuit 42, tri-state buffer circuits 43, buffer circuits 44, and an AND circuit 45. In FIG. 7, reference symbols R/W, CLK, and E denote a read/write signal, a clock signal, and an enable signal, respectively. Note that the 8-bit registers 151-1 to 151-4 in FIG. 4 are constituted by 8-bit registers arranged according to the 16-bit registers 121-1 to 121-4.

Figures 8, 9:
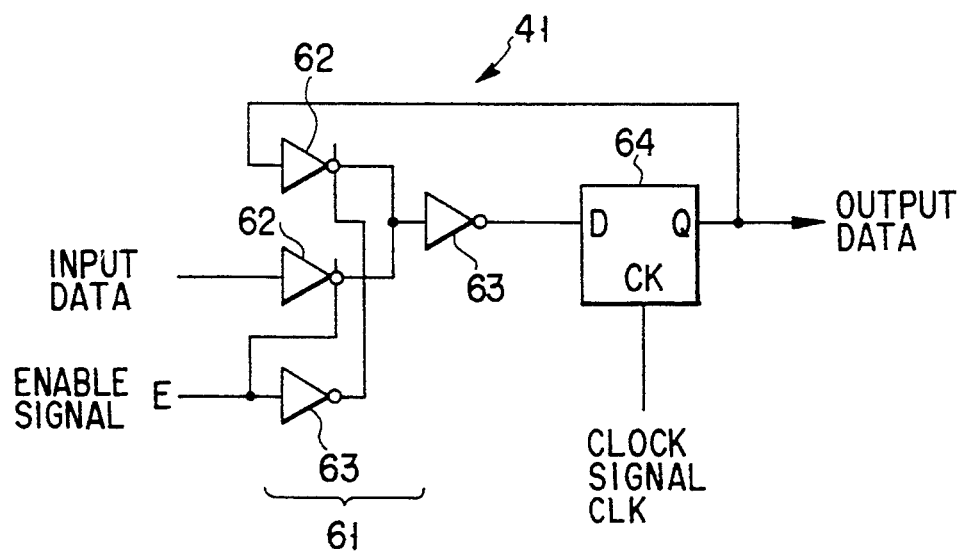
FIG. 8 is a circuit diagram showing a D F/F having an enable terminal in FIG. 7.
FIG. 9 is a table showing a relationship between the contents of address signals assigned to the registers in FIG. 4 and registers designated by the contents.
Figure 10:
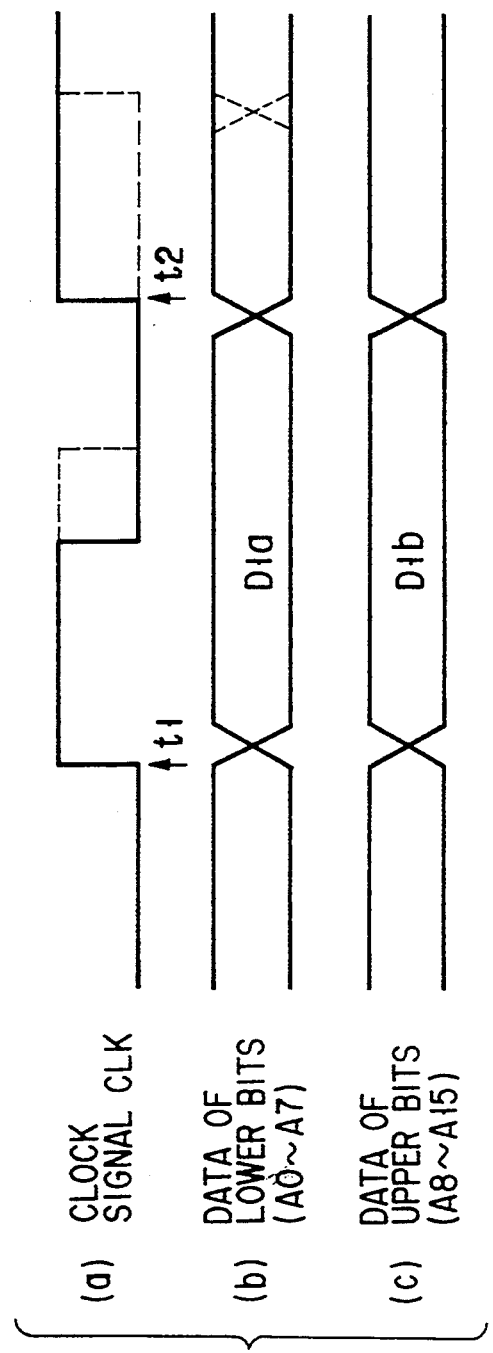
FIGS. 10 shows timing charts showing waveforms for explaining the operation of the circuit in FIG. 4.

FIG. 8 shows an example of the D flip-flop 41 having the enable terminal and shown in FIG. 7. The D F/F having the enable terminal, as is well-known, is constituted by clocked inverter circuits 62, inverter circuits 63, and a normal D (master-slave) F/F 64. The clocked inverter circuits 62 and the inverter circuits 63 constitute a multiplexer 61. In the above D F/F 64 having the enable terminal, when the enable signal E is set to be active ("1" level), the multiplexer or data input unit 61 receives input data output from the first bus wiring line 11. Except that the enable signal E is set to be active, the D-type F/F 64 receives a value obtained by feeding back output data Q from the D F/F 64 to hold internal data.

FIG. 9 is a table showing a relationship between the contents of address signals AD0 to AD2 constituting, e.g., three bits, and assigned to the registers 121-1 to 121-4 and 151-1 to 151-4 in FIG. 4 and registers selected in response to signals obtained by decoding the address signals.

With reference to FIGS. 4 to 10(c), the bus system of the semiconductor device according to the present invention will be described in detail hereinbelow. In the arrangement in FIG. 4, the fan-in counts and fan-out counts of the circuits connected to the bus wiring line are compared with each other. That is, the four first registers 121-1 to 121-4, the bidirectional buffer circuit 13, and the bus interface circuit 16, i.e., a total of 6 ,circuits are connected to the upper 8 bits (A8 to A15) and lower 8 bits (A0 to A7) of the first bus wiring line 14. The four second registers 151-1 to 151-4 are connected to the second bus wiring line 17. At this time, when the address of the 8-bit register 151-1 is designated, the designated 8-bit register 151-1 is selected, and the enable signal in FIG. 5 goes to "1" level. In this case, in the bus interface circuit 16 of FIG. 5, when the read/write signal R/W is set at "1" level (read mode), the output from the AND circuit 31 goes to "1" level, the tri-state buffer circuits 34-1 are rendered conductive, and the 8-bit bidirectional buffer circuit 16a transfers the data of the lower 8 bits (A0 to A7) of the first bus wiring line 14 to the second bus wiring line 17 (C0 to C7). In this manner, the value of the lower 8 bits (A0 to A7) of the first bus wiring line 14 is written in the designated 8-bit register 151-1. On the other hand, when the read/write signal R/W is set at "0" level (write mode), if the enable signal E is set at "1" level, the output from the AND circuit 33 goes to "1" level, and the tri-state buffer circuits 34-2 are rendered conductive. For this reason, the 8-bit bidirectional buffer circuit 16a transfers the data of the 8 bits (C0 to C7) of the second bus wiring line 17 to the lower 8 bits (A0 to A7) of the first bus wiring line 14. In this manner, the value of the designated 8-bit register 151-1 is transferred to the lower 8 bits (A0 to A7) of the first bus wiring line 14.

In this case, as shown in FIG. 5, in order to prevent the upper 8 bits (AS to A15) of the first bus wiring line 14 from being set in a high-impedance state, an output ("0" level) from each of the tri-state buffer circuits 35 of the 8-bit dummy buffer circuit 16b is supplied to the upper 8 bits (A8 to A15) of the first bus wiring line 14. As a result, the 16-bit load capacity of the first bus wiring line 14 is made uniform, and the transfer times of the bits of the first bus wiring line 14 are constant. That is, a bus arrangement is obtained such that a bus wiring line to which a plurality of circuits having different bit ranges are connected is divided for circuits except for the circuits each having the maximum bit count. For this reason, the global bus 14 and the local bus 17 have uniform loads. In addition, since the load of each of the bus wiring lines is smaller than that of a conventional wiring line, the speed of a data transfer operation through the bus wiring line is increased. For this reason, as shown in FIGS. 10(a) to 10(c), the transfer operation of the data D1a of the lower bits in FIG. 4 is not delayed, and the operating frequency of a clock can be increased in the data transfer operation through the bus wiring line. Therefore, according to the present invention, the performance of the system can be improved. In addition, since the 8-bit dummy buffer circuit 16b is connected to the upper 8 bits (A8 to A15) of the global bus 14, the global bus 14 has a uniform load, and variations in setup time and holding time of the F/F of each of the registers can be reduced, thereby shortening both the setup and holding times. For this reason, control accuracy of a semiconductor device can be improved, and the semiconductor device can be operated at a high speed.

As described above, in the bus system of the semiconductor device according to the present invention, when a plurality of circuits having different bit ranges are connected to a bus wiring line, the load capacity of the bus wiring line can be made uniform. For this reason, a data transfer operation through the bus wiring line can be performed at a high speed, and the operating frequency of a clock can be increased, thereby improving the performance of the system. Therefore, the present invention can be preferably applied to a microprocessor or a system LSI having a high operating frequency.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A bus system of semiconductor device comprising:
   a plurality of bus wiring lines, each having different predetermined bit ranges, at least two bus wiring lines of which are connected to each other; and
   a plurality of interface circuits, each having a buffer circuit which has a bit range equal to the lower bit range of the predetermined bit ranges of said at least two bus wiring lines, and which is connected between said at least two bus wiring lines, and a dummy buffer circuit which has a bit range equal to the difference between the bit range of said at least two bus wiring lines, and which is connected to a portion of said bus wiring line having the larger bit range of said at least two bus wiring lines, said portion of said bus wiring line having the larger bit range being a portion to which said buffer circuit is not connected.

2. A system according to claim 1, wherein a plurality of circuits having bit ranges equal to the bit ranges of said bus wiring lines are connected to said plurality of bus wiring lines, respectively.

3. A system according to claim 2, wherein said dummy buffer circuit has the dummy bit count for supplying the same fan-in and fan-out counts as those of said plurality of circuits to a bus wiring line of a larger bit range in said two bus wiring lines.

4. A system according to claim 1, wherein said buffer circuit of said bus interface circuit is a bidirectional buffer circuit.

5. A system according to claim 1, wherein said plurality of bus wiring lines and said plurality of interface circuits are formed in a semiconductor integrated circuit.

6. A system according to claim 1, wherein said semiconductor device is a microprocessor.

7. A bus system of a semiconductor device comprising:
   a first bus wiring line to which a plurality of first circuits, each having the same bit range are connected, said first bus wiring line consisting of a first portion and a second portion;

a second bus wiring line to which a plurality of second circuits, each having a bit range smaller than that of each of said first circuits are connected, the bit range of said second bus wiring line being equal to that of said first portion of said first bus wiring line; and a bus interface circuit having a buffer circuit connected between said first portion of said first bus wiring line and said second bus wiring line, and a dummy buffer circuit which has a bit range equal to the difference between the bit ranges of said first and second bus wiring lines and which is connected to said second portion of said first bus wiring line to provide said bus interface circuit with a load equal to that of each of said first circuits.

8. A system according to claim 7, wherein said buffer circuit has a bit range equal to a bit range of a bus wiring line of a smaller predetermined bit range in said first and second bus wiring lines.

9. A system according to claim 7, wherein said dummy buffer circuit has the dummy bit count for supplying the same fan-in and fan-out counts as those of said plurality of first circuits to a bus wiring line of a larger bit range in said first and second bus wiring lines.

10. A system according to claim 7, wherein said buffer circuit of said bus interface circuit is a bidirectional buffer circuit.

11. A system according to claim 7, wherein said plurality of bus wiring lines and said interface circuit are formed in a semiconductor integrated circuit.

12. A system according to claim 7, wherein said semiconductor device is a microprocessor.

* * * * *